Figure 1:
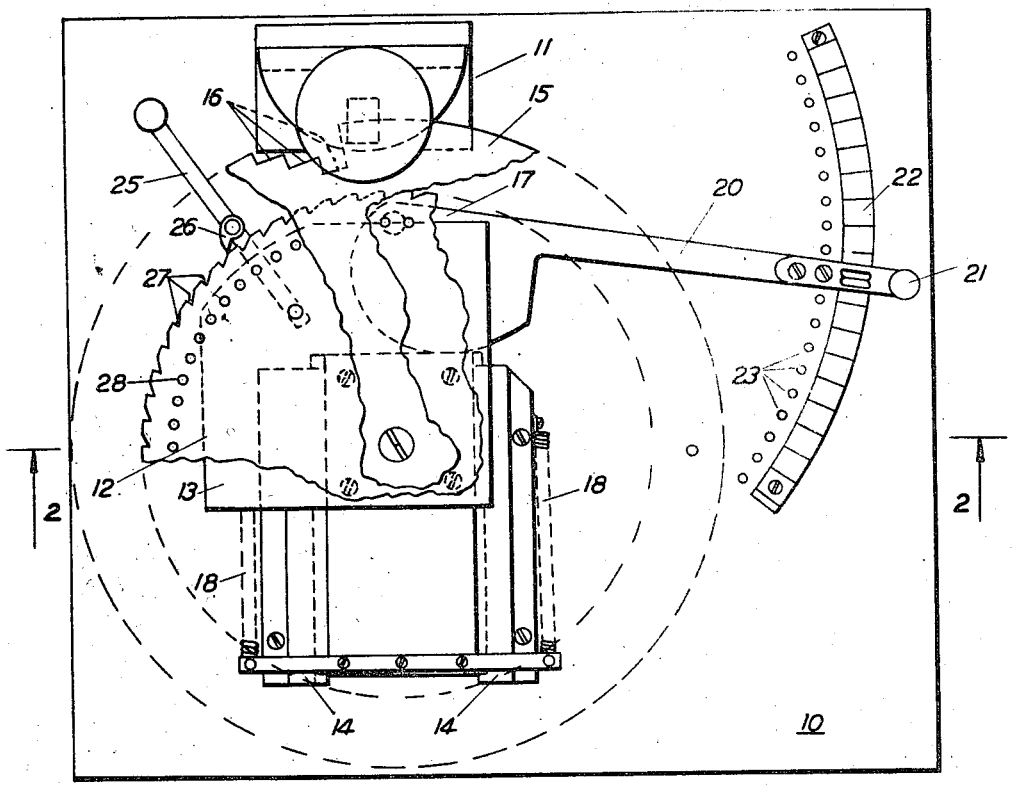

Aug. 29, 1944.    A. E. REEVES    2,356,885
LIGHT CHANGE APPARATUS
Filed July 1, 1941    2 Sheets-Sheet 1

INVENTOR.
ARTHUR E. REEVES
BY Robert W. Fulwider
ATTORNEY.

Aug. 29, 1944.  A. E. REEVES  2,356,885
LIGHT CHANGE APPARATUS
Filed July 1, 1941  2 Sheets-Sheet 2
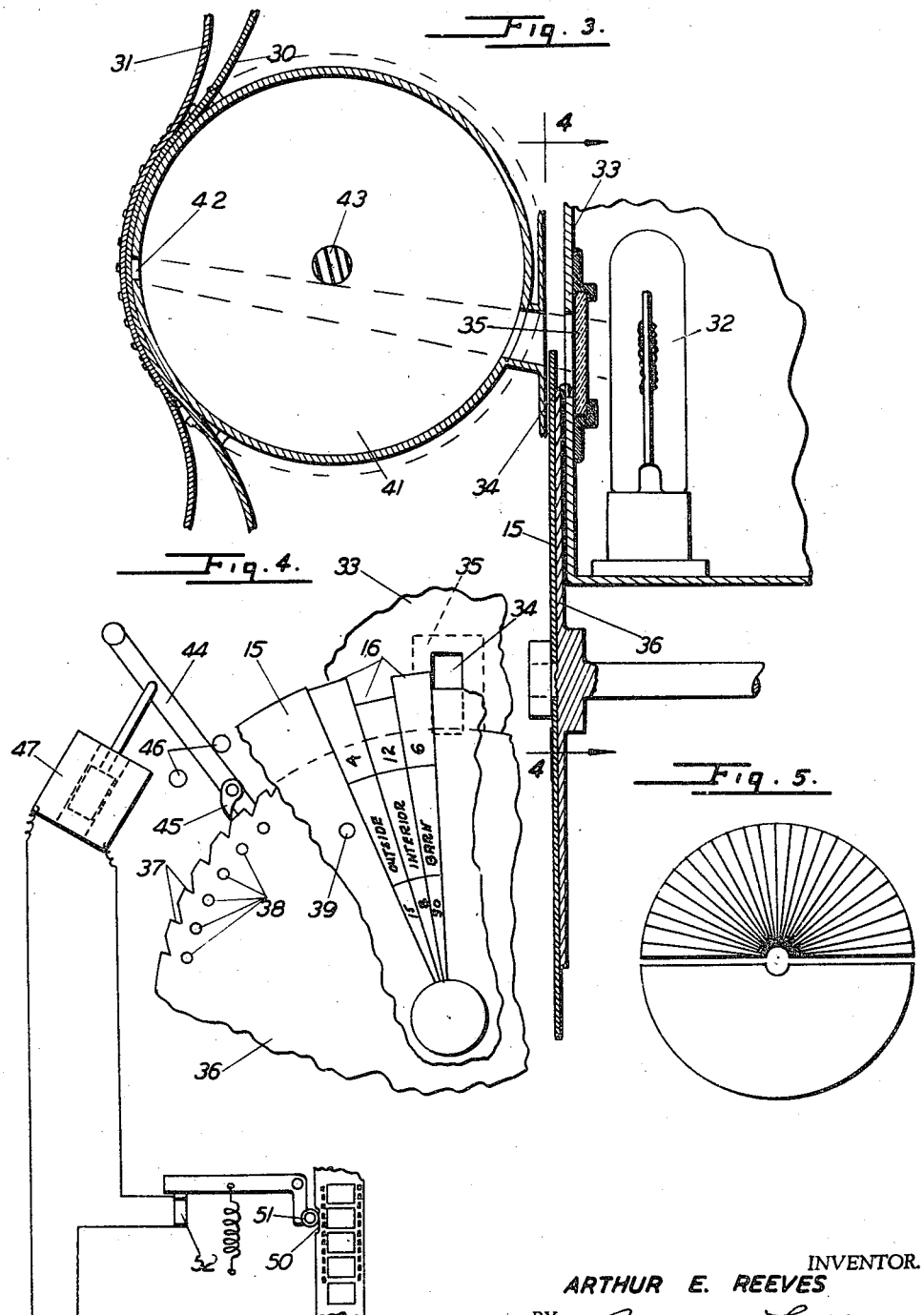
INVENTOR.
ARTHUR E. REEVES
BY Robert W. Fulwider
ATTORNEY.

Patented Aug. 29, 1944

2,356,885

UNITED STATES PATENT OFFICE 2,356,885

LIGHT CHANGE APPARATUS

Arthur E. Reeves, Los Angeles, Calif.

Application July 1, 1941, Serial No. 400,582

16 Claims. (Cl. 95—75)

My invention relates broadly to apparatus for controlling printing lights in photography and more particularly to novel means for accomplishing this in the printing of motion picture films.

In the production of prints of motion pictures for general release, it is quite important that the density of the finished positive film should remain reasonably constant, and since the density of the negative will vary over fairly wide limits, it has been found most practical to compensate for these changes by varying the effective intensity of the printing light. In the past, this has often been done by providing a resistance board on which a number of resistances may be independently varied and successively connected in series with the printing light as the various scenes are passed through the printer. This method has been open to the objection that each time a particular print is to be made, the resistance board must be completely set up as if the film were being printed for the first time. Another disadvantage has been that only a limited number of light changes could be effected by one board without resetting it, and at times this has severely restricted the amount of film which could be printed with one set-up on the printer.

Another method has been to provide means for varying the opening of a shutter placed in the path of the printing light so that the exposure may thereby be controlled.

However, the variable shutter type of light control has always been manually operated for each scene change, which of course means that an operator must be in attendance at all times. Manual control of the light change apparatus has been found to be generally unsatisfactory, since the operator will often make the wrong setting or miss a change altogether. This is particularly objectionable in printing sound track, since it usually necessitates reprinting the entire roll.

It is a major object of my invention to provide light control apparatus using a permanent control member which, when once made, may be stored and used at any time in the future without the necessity of providing a completely new set-up of the light control apparatus.

It is another object of my invention to provide such a control apparatus which may be used to furnish an indefinite number of light changes without having to stop the printer.

It is also an object of my invention to provide a light control apparatus which is fully automatic, thus obviating the possibility of an operator missing a light change when the scene changes.

It is a further object of my invention to provide such a control apparatus which is simple in construction and easy to use.

Figure 2:
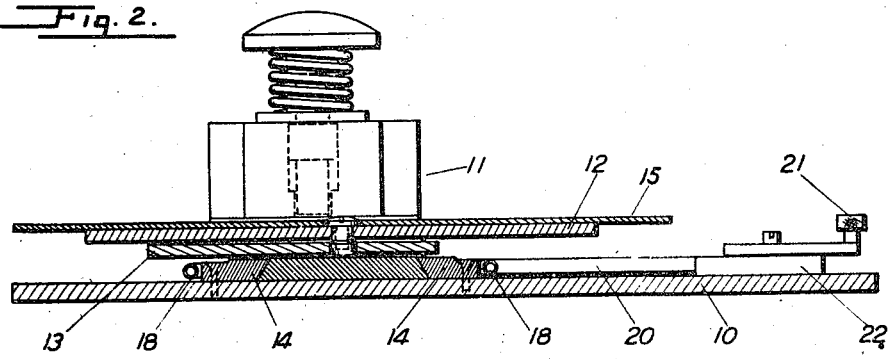

These and other objects of my invention will become apparent from the following description of a preferred form thereof, and from the drawings illustrating that form in which:

Fig. 1 is partially broken away plan view of the device used to form the control member or mask, Fig. 2 is a cross-sectional view of the mask-forming device taken at 2—2 in Fig. 1, Fig. 3 is a cross-sectional view of a printer, using my improved light control device, Fig. 4 is an elevational view of the printer taken at 4—4 in Fig. 3, and Fig. 5 is a view of a pair of control members, which may be used when there are to be a great number of light changes.

Briefly, my light control apparatus in its preferred embodiment makes use of a mask in the form of a disc of sheet material, such as cardboard or the like, provided with notches around its periphery, these notches preferably being formed by a device such as illustrated in Figs. 1 and 2. The mask is then placed in a printer, such for example as is shown in Figs. 3 and 4, where its edge partially covers an aperture, the depth of the notch in register therewith determining the amount of light passing through said aperture and available for printing. As the printing of one scene is completed, the mask is moved so that a different notch is brought in register with the aperture to vary the effective size thereof and thus provide the correct exposure for said scene.

Referring now to the drawings and particularly to Figs. 1 and 2 thereof, the numeral 10 indicates a base which may be of any suitable material, but is preferably made of metal so that the alignment and adjustment of parts will be substantially unaffected by normal use. A punch 11, which may be either hand or power operated, is mounted near one edge of the base 10 and is adapted to punch a notch approximately the width of the printing light aperture and substantially as long as the latter.

A rotatable plate 12 aligned with the center of the punch 11 and having serrations 27 around its periphery so that it may act as a ratchet, is mounted on a carriage 13 which is slidable in ways 14 toward and away from the punch 11. If desired, provision may be made to compensate for wear of the ways 14 in any well known manner, and the carriage 13 will thus be firmly held against lateral or vertical motion while it may freely slide longitudinally.

When the carriage 13 is nearest the punch 11, it will be apparent that the punch will be closest to the center of the rotatable plate 12, and hence if a disc 15 having a diameter greater than that of the plate 12 is mounted on the plate, a deep notch can be cut in the disc when the carriage is in this position. It will also be seen that as the carriage 13 is moved away from the punch 11, the notches which the punch can cut in the disc 15 will be shallower, and in Fig. 1, various notches 16 of different depth are shown cut in the edge of the disc 15, as the result of having the carriage at different distances from the punch. Since the depth of the notch determines the amount of light which is available for printing the film, means must be provided for easily and accurately varying the position of the carriage 13, and for this purpose I prefer to employ a cam 17, which is rotatably mounted on the base 10 between the ways 14 and the punch 11. The end of the carriage 13 nearest the punch 11 may then act as the cam follower, and to insure the follower bearing against the cam 17 at all times, I provide spring means 18 urging the carriage 13 and its associated plate 12 and disc 15 toward the punch 11. By rotating the cam 17, it is thus possible to move the disc 15 away from the punch 11 so that a shallower notch 16 will be cut, and by rotating the cam in the opposite direction, the spring means 18 will urge the disc closer to the punch and a deeper notch may be formed.

To rotate the cam 17 and to indicate its position, I provide the lever 20 which is attached to the cam or formed integral therewith, and preferably has a knob or handle 21 on its outer end for ease of adjustment. A scale 22 permits the operator to set the cam 17 to any desired position in a minimum of time, and is preferably graduated to read in light values corresponding to the printer scale. The space between successive graduations on the scale 22 is preferably a constant, though it may vary if desired, but in either event the shape of the cam is determined by the position of the lever 20 and the amount of light which must be available for printing when the lever is in this position. To insure that the lever 20 is properly set on the scale 22, I prefer to furnish means which will center the lever on the corresponding scale number, and in the drawings I have illustrated one form of such means consisting of a series of indentations 23 in the base 10 near the scale 22 which engage a spring-pressed ball carried by the lever 20.

To rotate the plate 12 and the disc 15 to their next position after a notch 16 has been cut in the edge of the disc, I provide an arm 25 pivotally mounted on the carriage 13 and provided with a spring pressed pawl 26 which engages one of the serrations 27 around the periphery of the plate 12. By moving the arm 25, the plate 12 will be rotated a distance sufficient to bring an unnotched area of the disc 15 beneath the punch 11. A spring pressed detent, such as a ball bearing urged into a series of holes or indentations 28, is provided so that the plate 12 will stop in the proper location and remain there while the disc 15 is being notched, and register pins (not shown), attached to the upper surface of the plate, engage the disc 15 and firmly hold it in position.

In use, the correct printing light for each scene of a reel of film is determined by suitable means and a circular disc, such as that usually packed in each can of film, is placed on the plate 12. The lever 20 is set opposite the number on the scale 22 corresponding to the indicated printing light for the first scene, and the punch 11 is operated. The arm 25 is then moved to rotate the plate 12 and disc 15 one position, the lever 20 is set for the light value of the second scene and the punch 11 is operated to cut the appropriate notch for that scene. This series of operations is then repeated for each of the scenes in the reel. When all of the scenes' light values have thus been transferred to the disc 15, the disc will have a stepped edge around all or a part of its circumference, and this disc may then be used to control the printing light in the printer now to be described, the disc preferably being stored at all times with the negative in one can so that they will always be together. For convenience, I prefer to make notations on the disc 15 as to the number of feet in each scene, the nature thereof, and the light number to be used in printing it, as shown in Fig. 4, but this is not essential and may be omitted if desired.

When the disc 15 has been completed, it is placed in a suitable printer such for example as shown in Figs. 3 and 4, and the negative 30 for which it was prepared, together with the proper positive raw stock 31 is threaded through the printer. It is to be understood that the herein described method of driving the films 30 and 31 and the distances between various parts are by way of example only, and while the form shown has been found quite satisfactory, many other forms will be found suitable for use in my invention.

In the form of printer illustrated, a suitable light source 32 is enclosed in a housing 33 having an aperture 34 therein covered by a diffusing member 35 such as ground glass, etc. A plate 36, similar to the rotatable plate 12 of the notching device, is rotatably mounted in front of the aperture 34, and serrations 37 are provided around the edge of the plate corresponding to the serrations 27 of plate 12, while a suitable detent means such as holes 38 and a spring pressed ball bearing engaging the latter insure proper alignment. Register pins 39 are located similarly to the register pins of the rotatable plate 12 and provide means for engaging and holding the disc 15 in its proper position at all times. As will be seen from Fig. 4, the plate 36 is located so that it is substantially clear of the aperture 34, and so that the disc 15 covers substantially all of the aperture when an unnotched portion of the disc is in front of it. The notches 16 thus vary the effective size of the aperture 34, and the depth of the notches determines the amount of light which passes through the aperture and is available for printing the film, and since the notches have been correlated to the various scenes in the negative 30, it is a simple matter to produce a properly exposed positive.

The light which has passed through the aperture 34 as modified by the disc 15 may be directed through a chamber 41 and to a printing aperture 42 where it impinges upon the films 30 and 31. The amount of light to which the films are exposed will be dependent, of course, upon the intensity of the light falling on the films and the length of time the films are exposed to it. As will be apparent, the intensity of the light at the printing aperture 42 will depend upon the effective area of the aperture 34 and consequently as this is varied by the notches 16 in the disc 15, the exposure of the films is correspondingly varied.

The films may be held in position at the printing aperture 42 by any convenient means, not shown, such for example as a conventional film gate. Likewise, any suitable means may be used for advancing the films past the printing aperture in proper manner.

To rotate the disc 15 to bring the successive notches thereof into effective position as required by scene changes, a pivotally mounted lever 44 may be attached to the housing 33 and provided with a spring-pressed pawl 45 which will engage the serrations 37 much in the manner of the arm 25 of the notching device. Stops 46 may likewise be provided to limit the motion of the lever 44, but instead of manually reciprocating the lever, I prefer to use a solenoid 47, or other suitable means, whereby the film itself may cause the lever to be operated. Thus, as shown in Fig. 4, the negative film 30 may be provided with a notch 50 wherever the printing light is to be changed, and a roller 51 caused to bear against the side of the film and adapted to be moved by the passage of the notch to close a switch 52 which momentarily energizes the solenoid 47. It is to be understood, of course, that I do not claim as my own the idea of notching the film to cause this operation, this practice being well known in the art and used to operate other types of light control devices.

In the operation of the printer, the films 30 and 31 are threaded through it and the disc 15 is placed on the rotatable plate 36 with the appropriate notch 16 in front of aperture 34. The light 32 is then turned on and the film drive means started. As the films pass through the printer, the notches 50 on the negative film will cause the switch 52 to close so that the solenoid 47 will be energized to bring the proper notches 16 successively in front of the aperture 34.

To take care of the condition where there are more light changes in a single reel of film than can be accommodated by a single disc 15, I have developed the form of disc shown in Fig. 5, where the usual disc is bisected so that a portion of the notches are on each half. The disc is then installed on the plate 36, and after the first half has been used, it can be removed, and a third half mounted in position while the second half is controlling the printing operation. It is thus possible to print extra long lengths of film without stopping the printer to change the light control.

From the foregoing, it will be seen that I have developed a light control apparatus which is fully capable of achieving the objects and advantages set forth, and while I have shown and described a preferred form of my invention it is to be understood that I do not wish to be limited to the particular form or arrangement of parts herein described and shown, except as limited by the following claims.

I claim as my invention:

1. Light control apparatus of the character described which includes: a light source; a housing enclosing said source and having an aperture therein; a rotatable member attached to said housing and substantially clear of said aperture, said rotatable member having a ratchet portion thereon; a mask having notches in the edge thereof adapted to be mounted on said rotatable member and positioned thereon by means of register pins on said rotatable member, said mask permitting a continuous but variable passage of light in accordance with the depth of said notches; and a reciprocable member moving between limits and having a pawl thereon adapted to engage the ratchet portion of said rotatable member and move an adjacent notch of said mask into alignment with said aperture.

2. A printer for motion picture films which includes: a housing having an aperture therein; a light source within said housing and adapted to emit light through said aperture; a rotatable member attached to said housing and having its edge adjacent but substantially clear of said aperture, said member having a ratchet portion thereon; a removable mask having notches in its edge, said mask being mountable on said rotatable member so that the notches therein may be aligned with said aperture and vary the passage of light in accordance with the depth of said notches; means for guiding film across the light passing said mask whereby the images on one film may be printed onto another film; a reciprocable member movable between limits and having a pawl thereon adapted to engage the ratchet portion of said rotatable member whereby the latter may be moved to remove one notch from said aperture and align an adjacent notch therewith; and means controlled by said film for operating said reciprocable member.

3. A mask for controlling the quantity of light passing through an aperture used in printing photographic film and consisting of a sheet of substantially opaque material having a plurality of adjoining notches along its edge, the bases of said notches being flat and the depth of said notches being proportional to the amount of light which it is desired to pass through said aperture whereby when said mask is moved to bring consecutive notches abreast of said aperture, the light passing therethrough is varied but not interrupted.

4. In apparatus for controlling the amount of light used in printing a photographic film, a circular mask having a plurality of adjoining stepped notches along its edge, said notches having flat bases and widths substantially equal to the width of the printing aperture with which they are to be used, the depth of said steps being proportional to the amount of light which it is desired to use in printing said film whereby when said mask is rotated to bring consecutive notches abreast of said aperture, the light passing therethrough is varied but not interrupted.

5. In light control apparatus for printing motion picture film, the combination of: means defining an aperture adapted to pass light therethrough to print said film; a mask movably mounted adjacent said aperture and adapted to vary the size thereof without completely masking the same between separate positions of said mask the intensity of said light being uniform across the area of film exposed thereto; and means for moving said mask to effect said variance of the quantity of light passing through said aperture without interrupting the same.

6. In light control apparatus for printing motion picture film, the combination of: means defining an aperture adapted to pass light therethrough to print said film; and a notched mask movably mounted adjacent said aperture and adapted to modify the size thereof to thereby pass a continuous but variable quantity of light through said aperture, the intensity of said light striking said film being uniform across the entire area thereof.

7. Light control apparatus of the character described which includes: a light source; means forming an aperture aligned with said light source; a rotatable member mounted adjacent said aperture, said rotatable member having a ratchet portion thereon; a mask having notches in the edge thereof adapted to be mounted on said rotatable member to rotate therewith, said mask permitting a continuous but variable passage of light in accordance with the depth of said notches; and means cooperating with the ratchet portion on said rotatable member to periodically align successive notches of said disc with said aperture.

8. Light control apparatus of the character described which includes: a light source; means forming an aperture aligned with said light source; a rotatable member mounted adjacent said aperture; a mask having notches in the edge thereof adapted to be mounted on said rotatable member to rotate therewith, said mask permitting a continuous but variable passage of light in accordance with the depth of said notches; and means for intermittently rotating said rotatable member to align successive notches of said disc with said aperture.

9. Light control apparatus of the character described which includes: a light source; means forming an aperture aligned with said light source; a mask having notches in the edge thereof, permitting a continuous but variable passage of light in accordance with the depth of said notches; means for movably mounting said mask with said notches aligned with said aperture; and means for intermittently moving said mask to align successive notches thereof with said aperture to vary the amount of light passing through said aperture.

10. Light control apparatus of the character described which includes: a light source; means forming an aperture aligned with said light source; a mask having notches in the edge thereof, permitting a continuous but variable passage of light in accordance with the depth of said notches; means for movably mounting said mask with said notches aligned with said aperture, said means having a ratchet portion thereon; and means cooperating with said ratchet portion for intermittently moving said mask to align successive notches thereof with said aperture to vary the amount of light passing through said aperture.

11. Light control apparatus of the character described which includes: a light source; means forming an aperture aligned with said light source; a movably mounted mask having a plurality of contiguous notches alignable with said aperture, permitting a continuous but variable passage of light in accordance with the depth of said notches; means for intermittently moving said mask to successively align said notches with said aperture to vary the effective size thereof; and means for holding said mask in said successive positions for a predetermined interval of time.

12. Light control apparatus of the character described which includes: a light source; means forming an aperture aligned with said light source; a movably mounted mask having a plurality of contiguous notches alignable with said aperture, each of said notches having a flat base and being substantially the same width as said aperture so that when aligned therewith they will modify the effective height thereof; and means for moving said mask at predetermined intervals to align successive notches thereof with said aperture to thereby vary the amount of light passing therethrough.

13. A printer for motion picture film which includes: a light source; means forming an aperture aligned with said light source; a movable member having an edge adjacent but substantially clear of said aperture, said member having a ratchet portion thereon; a mask mountable on said movable member and having notches on its edge alignable with said aperture to vary the passage of light in accordance with the depth of said notches; means for guiding film across the light passing said mask whereby images on one film may be printed onto another film; means adapted to engage the ratchet portion of said movable member whereby it may be moved to remove one notch of said mask from said aperture and align an adjacent notch therewith; and means controlled by said film for periodically operating said ratchet engaging means.

14. A printer for motion picture film which includes: a light source; means forming an aperture aligned with said light source; a movable member having an edge adjacent but substantially clear of said aperture; a mask mountable on said movable member and having notches on its edge alignable with said aperture to vary the passage of light in accordance with the depth of said notches; means for guiding film across the light passing said mask whereby images on one film may be printed onto another film; means associated with said movable member whereby it may be moved to remove one notch of said mask from said aperture and align an adjacent notch therewith; and means controlled by said film for periodically operating said actuating means.

15. A printer for motion picture film which includes: a light source; means forming a printing aperture aligned with said light source; means for moving a film to be printed across said printing aperture; means forming a light control aperture between said light source and said printing aperture; a movable mask mounted adjacent said light control aperture and provided with a plurality of notches adapted to be aligned with said aperture to vary the effective size thereof in accordance with the depth of said notches, to thereby vary the intensity of the light falling on said printing aperture; and means for intermittently moving said mask to align successive notches with said control aperture.

16. A printer for motion picture film which includes: a light source; means forming a printing aperture aligned with said light source; means for moving a film to be printed across said aperture; a movable mask mounted between said aperture and said light source and provided with a plurality of contiguous notches whose depths have been predetermined in accordance with the desired printing light for successive scenes on said film, said notches being adapted to be aligned with said aperture to vary the quantity of light passing therethrough and distributing said light uniformly across the area of film exposed thereto; and means operable in response to scene changes on said film to move said mask to align successive notches with said aperture, thereby varying the effective printing light without interrupting the same.

ARTHUR E. REEVES.